July 8, 1952   R. C. WIARD   2,602,672
COLLET OR CHUCK
Filed July 1, 1947
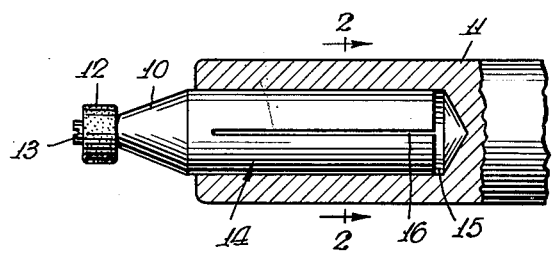
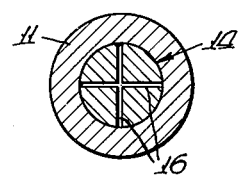
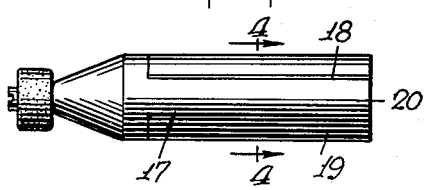
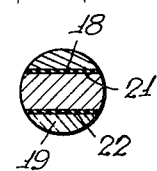
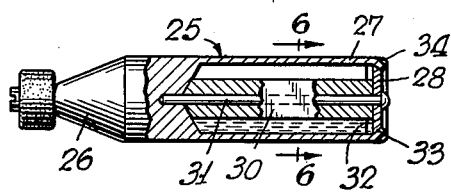
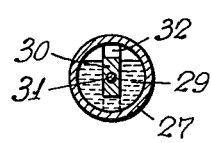
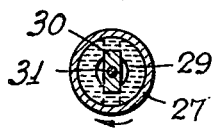
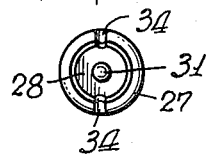
INVENTOR.
Robert C. Wiard
BY
ATTORNEYS Patented July 8, 1952

2,602,672

UNITED STATES PATENT OFFICE 2,602,672

COLLET OR CHUCK

Robert C. Wiard, New Britain, Conn., assignor to The New Britain Machine Company, New Britain, Conn., a corporation of Connecticut Application July 1, 1947, Serial No. 758,302

10 Claims. (Cl. 279—41)

My invention relates to tools for rotation at very high speeds and to chucking means therefor.

In high-speed rotating tools it is important that there be a maximum of coaxial alignment between the tool, the tool-supporting means, and the chuck. It is also important that the rotating masses be confined as near as possible to the rotating axis. It is further desirable that the chucking means be of the simplest possible construction. Conventional chucks with movable jaws, tapered sockets, and the like, are generally unsatisfactory in meeting the above requirements.

It is, accordingly, an object of my invention to provide improved chucking means for supporting a tool for rotation at very high speed.

It is also an object to provide improved chucking means that will have high torque-transmitting characteristics at the contemplated very high speeds of rotation.

It is a general object to meet the above objects with a structure that is inherently simple and which provides for ready insertion and removal of a tool or of a tool-supporting member from a chuck.

Other objects and various further features of the invention will be pointed out or will occur to those skilled in the art from a reading of the following specification in conjunction with the accompanying drawings. In said drawings:

Fig. 1 is a partly sectionalized view illustrating a combination according to the invention in which a tool-supporting member is held in a chuck;

Fig. 2 is a sectional view taken in the plane 2—2 of Fig. 1;

Fig. 3 is a side view of a modified construction according to the invention;

Fig. 4 is a sectional view taken in the plane 4—4 of Fig. 3;

Fig. 5 is a partly sectionalized side view illustrating a further embodiment according to the invention;

Figs. 6 and 7 are sectionalized views taken in the plane 6—6 of Fig. 5 and illustrating the device under static and dynamic conditions, respectively; and Fig. 8 is an end view of the arrangement of Fig. 5.

Briefly stated, my invention contemplates the use of a tool or tool-supporting device having a shank formed with a quill which is radially outwardly expandable or otherwise deformable under the action of centrifugal force. The outer surface of the quill is preferably cylindrical to conform throughout with the surface of a cylindrical bore in the chuck. The tendency of the quill to expand with increasing rotational speeds results in an increasing torque-transmitting bond between the chuck and the tool.

In one of the forms to be described, the quill is longitudinally split so as to form in effect a plurality of fingers which under the action of centrifugal force may expand for better gripping with the chuck. In another form, the quill is formed with a longitudinally extensive cylindrically arcuate portion integral with the body of the tool or tool-supporting device, and there is another correspondingly extensive cylindrically arcuate portion separate from the body of the device, to mate with the first portion and in effect to provide a radially outwardly expandable quill. In the third embodiment, the quill includes a tubular portion having a thin wall and containing mercury or other displaceable means which at high speed may apply uniform outwardly deforming pressures on the shell of the quill.

Referring to Figs. 1 and 2 of the drawings, my invention is shown in application to a tool-supporting member 10 held in a chuck 11 for rotation at very high speeds. The tool shown is a small grinding wheel 12 secured as by a screw 13 to the projecting end of the tool-supporting device 10. The tool-supporting device 10 is defined essentially by a shank or body including a quill 14 to fit in a single bore 15 in the chuck 11. In the preferred form shown, the outer surface of the quill 14 is cylindrical and of the same size as the bore 15.

In accordance with the invention, the outer surface of the quill 14 is effectively radially outwardly deformable under the action of centrifugal force. This outer surface may, therefore, form an extensive friction surface to grip the chuck 11 when the tool is rotated at high speed. In the form shown in Fig. 1, the effective deformation is obtained by longitudinally slotting the quill 14, as at 16. It will be appreciated that even though the quill 14 and the bore 15 may be of the same size, the longitudinal split 16 may permit whatever radially inward deformation may be necessary to allow very easy insertion of the device 10 into chuck 11. Once rotation commences, however, centrifugal force may act on the relatively large mass of the longitudinally extending fingers formed by slits 16, so that there may be a substantially uniform (both longitudinally and circumferentially) distribution of gripping forces. It will be clear that the effectiveness of these gripping forces for torque-transmitting purposes will increase with the speed of rotation.

Referring to Figs. 3 and 4, I show a modification of the arrangement of Fig. 1 wherein the radially outward expansion of a quill 17 is obtained by the displacement of elements 18—19, effectively separated from the body 20 of the quill 17. In the form shown, the quill 17 is defined by a body having symmetrically opposed generally parallel flats and cylindrically arcuate sides. The movable elements 18—19 are also cylindrically arcuate and are longitudinally coextensive with the flats of the body 20. The cylindrical portions of all elements of the quill 17 are of the same radius so as to present an extensive bonding surface to the bore 15 of, say, chuck 11. Since the elements 18—19 are separate from the main body 20 of quill 17, their radially outward displacement under the action of centrifugal force may be completely uniform longitudinally. If desired the quill 17 may be formed in unit-handling relation without impairing the above-described uniform bonding with the chuck, by sandwiching layers of rubber-like resilient material (as at 21—22) between elements 18—20 and 20—19, respectively.

In Figs. 5 through 8, I show still another modification of the invention in which the quill 25 of a tool-supporting device 26 is radially outwardly expandable under the action of a completely uniform distribution of pressure. According to this modification, the quill 25 includes a deformable tubular portion 27, which may be formed upon boring the shank of device 26. The tubular portion 27 may be closed off at the end, as by swaging, crimping, or beading the same to a cap member 28. The outwardly deforming pressures may be provided by a liquid 29 such as mercury within the quill 25, and it will be clear that the distribution of gripping forces along the quill may be completely concentric and substantially uniform longitudinally. For purposes of illustration, Fig. 6 shows the liquid 29 as not quite filling the volume within the quill 25. When rotating, as in Fig. 7, it is clear that the liquid 29 will be uniformly distributed in the manner shown.

If desired for purposes of accelerating the liquid 29 more or less in accordance with the acceleration of the tool-supporting device 26, the quill 25 may include a paddle member 30 symmetrically supported with respect to the axis of quill 25. In the form shown, the paddle 30 is a strip centrally drilled to accommodate a locating pin 31 and fitting at the back end in a groove or slot 32, formed in the cap member 28 for keying purposes. If desired, further keying security may be assured by forming the end of cap member 28 with peripheral discontinuities or recesses 33 into which the beaded end of the tube 27 may be swaged or staked, as at 34. It will be understood that, upon accelerating the quill 25 from rest, the liquid 29 may have such inertia as to require relatively substantial time to attain the driven rotary speed of the quill 25; with the paddle 30, however, means are provided for more positively driving the fluid 29 to help it more quickly attain or approach the driven rotary speed of quill 25, thus making possible the generation of more effective chucking forces in a relatively short interval of time.

It will be appreciated that I have described relatively simple chucking means for particular application to the transmission of torque at very high speeds of rotation. The torque-transmitting characteristics improve with increasing speed and, since the torque-transmitting characteristics are substantially zero at zero speed, tools or tool-supporting members embodying features of the invention may be readily inserted and removed from single-bore chucks.

While I have described my invention in detail for the preferred forms shown, it will be understood that modifications may be made within the scope of the invention as defined in the appended claims.

I claim:

1. In a tool-supporting device for rotation at very high speed positive tool-attachment means for securely supporting a tool on said device independent of the action of centrifugal force, a shank including a longitudinally split chuck-engaging quill with a cylindrical outer surface, and chuck having a cylindical bore to receive said quill.

2. In combination, a tool-supporting device for rotation at very high speed, positive tool-attachment means for securely supporting a tool on said device independent of the action of centrifugal force, and a chuck having a single circumferentially continuous and relatively non-deformable cylindrical bore, said device including a quill with an outer surface of a curvature to conform throughout with the curvature of said bore, said quill including means radially outwardly displaceable under the action of centrifugal force, whereby the greater the rotational speed of said device the greater the torque-transmitting characteristics thereof.

3. In a tool-supporting device for rotation at very high speed, positive tool-attachment means for securely supporting a tool on said device independent of the action of centrifugal force, shank means including a chuck-engaging quill having a uniformly cylindrical outer surface to fit substantially over said entire surface within a single bore in a chuck, said attachment means including means for maintaining axial alignment of a tool with respect to said quill, parts of said surface of said quill being effectively radially outwardly displaceable, and means including a substantially uniformly longitudinal distributed displaceable mass carried with said quill for substantially longitudinally uniformly outwardly urging said parts under the action of centrifugal force, whereby when said device is rotated the tendency of said surface to displace radially outwardly may effect a torque-transmitting bond with said chuck.

4. In a tool-supporting device of the character indicated, a shank including a tubular quill defining an elongated hollow interior, the wall of said quill being radially deformable, means sealing both ends of the hollow interior, and freely displaceable means within the sealed interior of said quill, whereby under the action of centrifugal force said displaceable means may apply a circumferentially uniform and longitudinally extensive radially outward pressure to deform said quill for improved engagement with a chuck.

5. A device according to claim 4, in which said displaceable means is liquid.

6. A device according to claim 4, in which said displaceable means is mercury.

7. A device according to claim 4, in which said displaceable means is a liquid, and in which paddle means are provided within the sealed interior of said tubular quill, whereby said liquid may be accelerated substantially concurrently with acceleration of the rest of said tool-supporting device.

8. In a tool-supporting device of the character indicated, a shank including quill means to engage a single bore in a chuck, said quill means including a first portion formed with the body of said device, and of longitudinally extensive cylindrically arcuate shape, and a bodily movable portion correspondingly cylindrically arcuate and correspondingly longitudinally extensive, said portions fitting together to define a substantially uniform cylindrical surface to engage the chuck.

9. A device according to claim 8, in which a layer of resilient material is interposed between said portions, and in which said portions are both bonded to said resilient material.

10. In combination, a tool-supporting device for rotation at very high speed, positive tool-attachment means for securely supporting a tool on said device independent of the action of centrifugal force, and a chuck device to support said tool-supporting device, one of said devices including a relatively non-deformable and circumferentially continuous sleeve with a cylindrical bore of constant diameter, the other of said devices including a quill with an outer uniformly cylindrical deformable surface having a diameter conforming to the diameter of said bore for substantially the longitudinal extent of the fit of said quill in said sleeve, said quill further including a substantially uniformly longitudinally distributed displaceable mass carried with said quill for substantially uniformly radially outwardly urging said surface, whereby at rest said quill and said sleeve may be readily engaged and relatively lightly yet longitudinally uniformly frictionally held, and whereby upon rotation centrifugal action on said mass may increase the frictional bond between said devices while maintaining the longitudinally uniform distribution of said bond, further whereby with increasing rotational speeds there may also be improved axial-alignment support for a tool in said tool-supporting device.

ROBERT C. WIARD.

REFERENCES CITED

The following references are of record in the file of this patent:

UNITED STATES PATENTS

| Number | Name | Date |
| --- | --- | --- |
| 2,098,675 | Procunier | Nov. 9, 1937 |
| 2,153,521 | Indge et al. | Apr. 4, 1939 |
| 2,367,048 | Pentz | Jan. 9, 1945 |
| 2,367,863 | Grey | Jan. 23, 1945 |
| 2,373,321 | Lowe | Apr. 10, 1945 |
| 2,400,586 | Zimmermann | May 21, 1946 |
| 2,431,961 | Phillips et al. | Dec. 2, 1947 |
| 2,481,094 | Edwards | Sept. 6, 1949 |